(12) United States Patent
Hirata et al.

(10) Patent No.: US 9,650,961 B2
(45) Date of Patent: May 16, 2017

(54) GAS TURBINE COMBUSTOR INCLUDING BURNER HAVING PLURAL GASEOUS FUEL MANIFOLDS

(71) Applicant: Mitsubishi Hitachi Power Systems, Ltd., Yokohama (JP)

(72) Inventors: Yoshitaka Hirata, Tokyo (JP); Akinori Hayashi, Tokyo (JP); Hirokazu Takahashi, Tokyo (JP); Toshifumi Sasao, Tokyo (JP); Shohei Yoshida, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 529 days.

(21) Appl. No.: 14/081,609

(22) Filed: Nov. 15, 2013

(65) Prior Publication Data
US 2014/0144144 A1 May 29, 2014

(30) Foreign Application Priority Data

Nov. 26, 2012 (JP) .................................. 2012-257033

(51) Int. Cl.
*F02C 7/22* (2006.01)
*F23R 3/28* (2006.01)
(Continued)

(52) U.S. Cl.
CPC .............. *F02C 7/222* (2013.01); *F23D 14/78* (2013.01); *F23R 3/02* (2013.01); *F23R 3/28* (2013.01);
(Continued)

(58) Field of Classification Search
CPC .. F02C 7/222; F02C 7/28; F23D 14/02; F23D 14/78; F23D 17/002; F23D 2204/10;
(Continued)

(56) References Cited

U.S. PATENT DOCUMENTS 5,211,004 A * 5/1993 Black ..................... F23D 14/02
60/39.27
5,247,790 A 9/1993 Donlan et al.
(Continued)

FOREIGN PATENT DOCUMENTS

CN 101303131 A 11/2008
CN 102563650 A 7/2012
(Continued)

OTHER PUBLICATIONS

Japanese-language Office Action issued in counterpart Japanese Application No. 212-257033 dated Jul. 8, 2016 with English translation (Six (6) pages).
(Continued)

*Primary Examiner* — Gerald L Sung
*Assistant Examiner* — Scott Walthour
(74) *Attorney, Agent, or Firm* — Crowell & Moring LLP

(57) ABSTRACT

A gas turbine combustor includes: multiple gaseous fuel nozzles to inject gaseous fuel; a manifold to distribute gaseous fuel to the multiple gaseous fuel nozzles; a burner flange to secure a burner to an end cover; and a burner body to connect the manifold and the burner flange. Gaseous fuel passages are provided in the end cover, the burner flange, and the burner body. The gaseous fuel passage communicates with the manifold. A second manifold is provided in the burner flange. The gaseous fuel passage is provided in the burner body to make the second manifold communicate with the first mentioned manifold.

6 Claims, 3 Drawing Sheets

(51) Int. Cl.
*F23R 3/02* (2006.01)
*F23D 14/78* (2006.01)
*F23R 3/36* (2006.01)
F23D 14/02 (2006.01)
F23D 17/00 (2006.01)
F02C 7/28 (2006.01)

(52) U.S. Cl.
CPC .............. *F23R 3/283* (2013.01); *F23R 3/286* (2013.01); *F23R 3/36* (2013.01); *F02C 7/28* (2013.01); *F23D 14/02* (2013.01); *F23D 17/002* (2013.01); *F23D 2204/10* (2013.01); *F23D 2900/00003* (2013.01); *F23R 2900/00018* (2013.01)

(58) Field of Classification Search
CPC .. F23D 2900/00003; F23R 3/28; F23R 3/283; F23R 3/286; F23R 3/36
See application file for complete search history.

(56) References Cited

U.S. PATENT DOCUMENTS

| | | | |
|---|---|---|---|
| 6,209,326 | B1 | 4/2001 | Mandai et al. |
| 2007/0151255 | A1* | 7/2007 | Johnson ................ F23D 14/48 60/776 |
| 2008/0276622 | A1 | 11/2008 | Johnson et al. |
| 2009/0111063 | A1 | 4/2009 | Boardman et al. |
| 2010/0139238 | A1* | 6/2010 | Hall ...................... F23R 3/283 60/39.463 |
| 2012/0047897 | A1 | 3/2012 | Hirata et al. |
| 2012/0048971 | A1 | 3/2012 | Kaleeswaran et al. |
| 2014/0060063 | A1* | 3/2014 | Boardman ............. F23R 3/286 60/772 |

FOREIGN PATENT DOCUMENTS

| | | |
|---|---|---|
| JP | 6-193878 A | 7/1994 |
| JP | 2009-109180 A | 5/2009 |
| JP | 2011-75173 A | 4/2011 |
| JP | 2012-47408 A | 3/2012 |
| WO | WO 98/25084 A1 | 6/1998 |

OTHER PUBLICATIONS

Chinese-language Office Action issued in counterpart Chinese Application No. 201310505476.6 dated Apr. 27, 2015 with partial English translation (Seven (7) pages).

* cited by examiner

GAS TURBINE COMBUSTOR INCLUDING BURNER HAVING PLURAL GASEOUS FUEL MANIFOLDS

CLAIM OF PRIORITY

The present application claims priority from Japanese Patent application serial no. 2012-257033, filed on Nov. 26, 2012, the content of which is hereby incorporated by reference into this application.

TECHNICAL FIELD

The present invention relates to a gas turbine combustor.

BACKGROUND ART

The need for use of various fuels in a gas-turbine power system is increasing in terms of effective use of unused fuel. As a combustor compatible with various fuels for such a need, there is a dual-fuel compatible combustor compatible with both liquid fuel and gaseous fuel. The dual-fuel compatible combustor contains a liquid fuel nozzle to inject liquid fuel, a gaseous fuel nozzle to inject gaseous fuel, a mixing mechanism to mix fuel and air, etc. As a result, the number of components forming the combustor increases and its structure is complicated.

Many examples of such a combustor have been proposed, such as JP-A No. 2009-109180. In general, a combustor is structured from a combination of multiple components so that only the component damaged due to aged degradation etc. is exchangeable.

CITATION LIST

Patent Literature

[Patent Literature 1] JP-A No. 2009-109180

SUMMARY OF INVENTION

Technical Problem

As mentioned above, the gas turbine combustor has a complicated structure to be compatible with various fuels, and thus has many components. Therefore, passages of air and fuel supplied to the combustor are combined with multiple components. Usually, a fuel passage includes multiple components whose coupling portions are fastened by welding etc. to prevent fuel from leaking to an outside. However, in this case, since each component cannot be exchanged independently when damaged due to aged degradation etc., the overall combustor is exchanged at higher cost.

On the other hand, components of a combustor are combined mechanically, e.g., by bolting to solve the above disadvantage. However, in this case, sealing components are usually placed to coupling portions of the fuel passage to prevent fuel leakage. In general, the sealing components for such portions use a gasket, a metal O-ring, etc. Each sealing component needs to make sealing surfaces be in contact with each other evenly to provide its sealing function. However, since a temperature of air rises to several hundred degrees Celsius in the gas turbine combustor, its components are also heated to near the air temperature. When fuel of several ten degrees Celsius flows through such high temperature components, the portion where the fuel flows is cooled locally, and a temperature difference occurs. Due to this temperature difference, a thermal elongation difference occurs in the components of the combustor. This causes deformation in the components. Accordingly, even contact between sealing surfaces of the components becomes impossible and thus the sealing may be spoiled.

Therefore, it is desirable to provide a reliable combustor that prevents fuel leakage from a coupling portion between its components to the outside.

Solution to Problem

A gas turbine combustor mixes and combusts gaseous fuel and combustion air introduced from a compressor, and supplies produced combustion gas to a gas turbine. The combustor includes: an inner tube to produce combustion gas by combusting combustion air and gaseous fuel; an outer tube enclosing the inner tube; an end cover located upstream of the outer tube; and a burner secured to the end cover and placed in the inner tube. The burner includes: a mixer that mixes fuel and combustion air; multiple gaseous fuel nozzles that inject fuel; a manifold to distribute gaseous fuel to the multiple gaseous fuel nozzles; a burner flange to secure the burner to the end cover; and a burner body to connect the manifold and the burner flange. A gaseous fuel passage is provided in the end cover, burner flange, and burner body. The gaseous fuel passage communicates with the manifold. An annular second manifold is provided in the burner flange. The gaseous fuel passage is provided in the burner body to make the second manifold communicate with the first mentioned manifold.

Advantageous Effects of Invention

According to the present invention, it is possible to provide a reliable combustor that is able to prevent fuel from leaking from a coupling portion etc. between the components to an outside.

DESCRIPTION OF EMBODIMENTS

According to each embodiment of the present invention described below, it is possible to provide a reliable combustor that is able to prevent fuel leakage, e.g., from a coupling portion or connecting portion between its components to the outside even when its gaseous fuel passage is formed from combination of multiple components such as an end cover and a burner.

Hereafter, embodiments of a gas turbine combustor using the present invention is explained in reference to the figures.

First Embodiment

Figure 1:
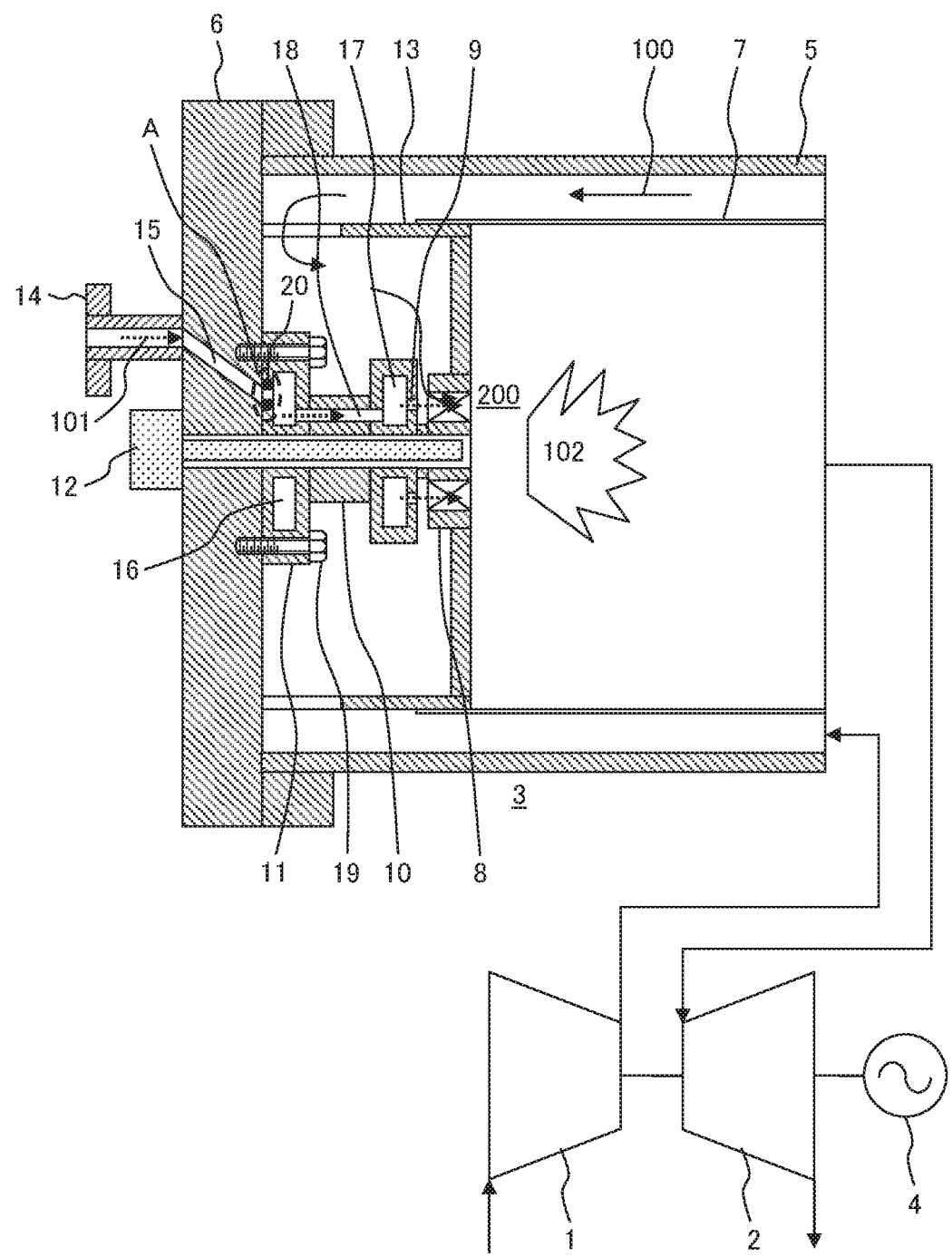
FIG. 1 is the overall structure of a gas turbine in a first embodiment.

A first embodiment of the present invention is described below in reference to FIGS. 1 to 3. FIG. 1 shows a longitudinal cross section showing the structure of the first embodiment of the gas turbine combustor of the present invention, and schematically shows the overall structure of a gas turbine plant including the gas turbine combustor.

The gas turbine power plant shown in FIG. 1 mainly includes a compressor 1 that compresses air to produce high-pressure combustion air, a combustor 3 that mixes combustion air 100 introduced from the compressor 1 and fuel to produce combustion gas 102, and a turbine 2 into which the combustion gas 102 produced by the combustor 3 is introduced. Axes of the compressor 1, the turbine 2, and a generator 4 are coupled.

The combustor 3 includes an inner tube (combustion liner) 7 to combust the combustion air 100 and fuel and to produce the combustion gas 102, an outer tube (combustor casing) 5 that encloses the inner tube 7, an end cover 6 and a burner 200 secured to the end cover 6 with bolts 19. A burner cover 13 is placed to the outer periphery of the burner 200. The burner cover 13 is inserted and secured in the inner tube 7.

The burner 200 includes a mixer 8 that mixes fuel and combustion air, multiple gaseous fuel nozzles 9 that inject fuel, a manifold 17 to distribute gaseous fuel to the multiple gaseous fuel nozzles 9, a burner flange 11 to secure the burner 200 to the end cover 6, and a burner body 10 to connect the manifold 17 and the burner flange 11. A liquid fuel nozzle 12 that injects liquid fuel into the inner tube 7 is placed in the axial center of the burner 200.

Gaseous fuel 101 flows from a gaseous fuel communication tube 14 provided to the end cover 6 through a gaseous fuel passage 15 provided in the end cover, is fed into the manifold 17 through the gaseous fuel passage 18 provided in the burner flange 11 and the burner body 10, is distributed from the manifold 17 to the multiple gaseous fuel nozzles 9, and is injected toward the mixer 8.

The end cover 6 and the burner flange 11 are secured to one another with the bolts 19. As shown in the section A of FIG. 1, around the gaseous fuel passage between the surfaces of the end cover 6 and burner flange 11, a sealing component such as a gasket and an O ring is usually sandwiched to prevent the gaseous fuel 101 from leaking to the outside. In this embodiment, an example using an O ring 20 is shown.

The first embodiment of the present invention in the combustor 3 configured in this way is such that an annular second manifold 16 is provided in the burner flange 11 that secures the burner 200 to the end cover 6.

Detailed events of the present invention configured as above are explained. FIG. 2 shows a conventional technology to be compared. FIG. 3 shows a longitudinal cross section around the burner 200 of the present invention. As shown in FIG. 2, in the conventional technology, the gaseous fuel 101 is supplied from the gaseous fuel passage 15 formed in the end cover 6 to the manifold 17 through the gaseous fuel passage 18 provided in the burner flange 11 and the burner body 10. At this time, the O ring 20 is placed between the surfaces of the end cover 6 and burner flange 11 to prevent leakage of the gaseous fuel to the outside. The combustion air supplied to the combustor 3 rises to several hundred degrees Celsius at the maximum. On the other hand, the temperature of gaseous fuel such as LNG is as low as tens of degrees Celsius. Therefore, the end cover 6 and multiple components configuring burner 200 are heated to near the temperature of the combustion air. However, when the gaseous fuel 101 is supplied, the periphery of the fuel passages is cooled locally and a large temperature difference occurs between the components of the burner 200.

Figure 2:
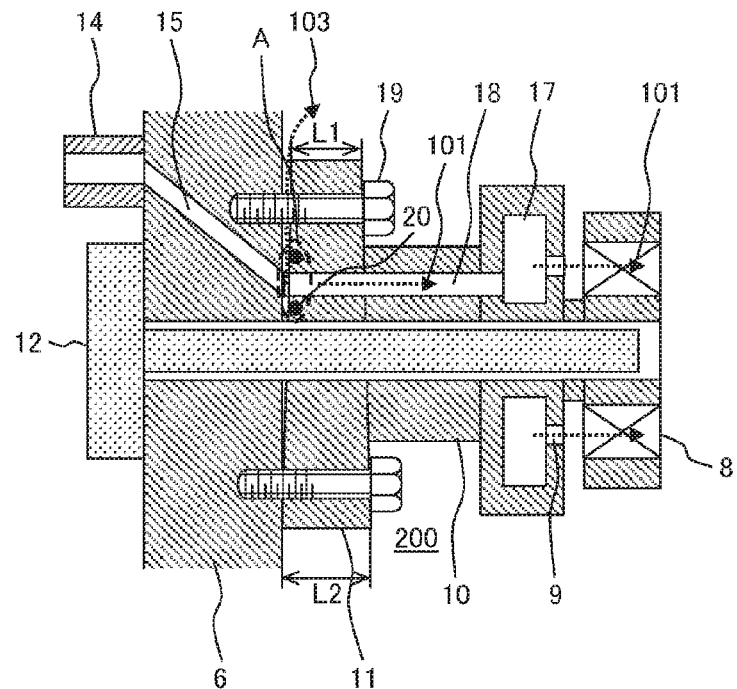
FIG. 2 is a partial longitudinal cross section around a burner having a conventional configuration.

Due to this temperature difference, deformation occurs in the burner flange 11 of FIG. 2. This is because L2 is made large due to thermal expansion by high temperature at the location apart from the gaseous fuel passages and the location near the gaseous fuel passage 18 is cooled by the gaseous fuel 101 to make L1 small. Therefore, when a gap is produced between the surfaces of the end cover 6 and burner flange 11 and the gap exceeds the quantity of plasticity of the O ring, gaseous fuel 103 may be leaked to the outside. In this case, since the gaseous fuel 103 flows to a portion other than the mixer 8, flame may be ignited in a portion other than where flame should be ignited. Accordingly, the combustor 3 may be damaged.

Figure 3:
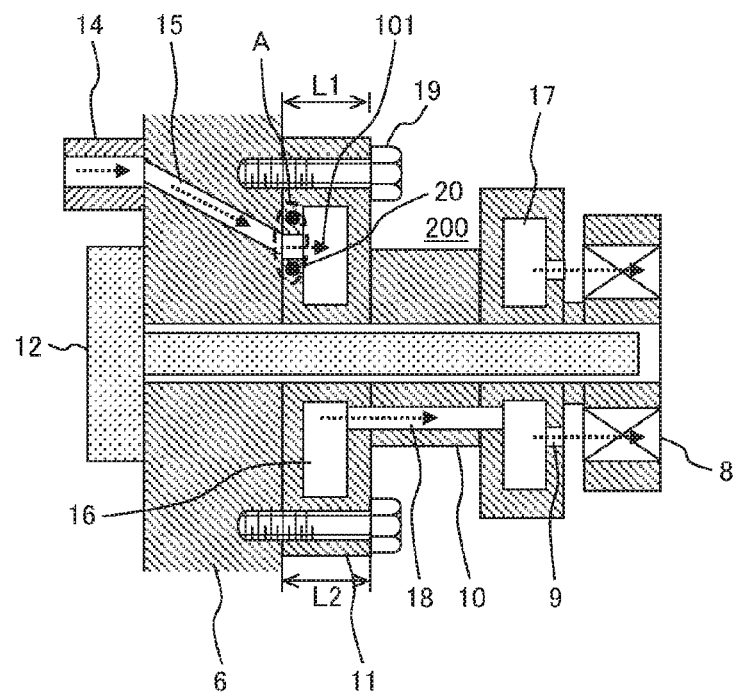
FIG. 3 is a partial longitudinal cross-section around a burner in the first embodiment.

In contrast to such a structure of the conventional technology, the embodiment of the present invention is such that an annular second manifold is provided in the burner flange 11, as shown in FIG. 3. By providing such a second manifold, the gaseous fuel 101 flows through the second manifold provided in the burner flange 11 to cool the overall burner flange. Therefore, since it becomes difficult to generate a great temperature difference in the burner flange 11 and thus neither deformation nor gap is produced, the above disadvantage is soluble.

To further provide the advantageous effect of this embodiment, an inlet and outlet of the second manifold 16 are circumferentially opposed. As a result, the gaseous fuel is able to flow throughout the second manifold 16, the temperature of the burner flange 11 can be made more uniform, and the reliable combustor can be provided.

Second Embodiment

Figure 4:
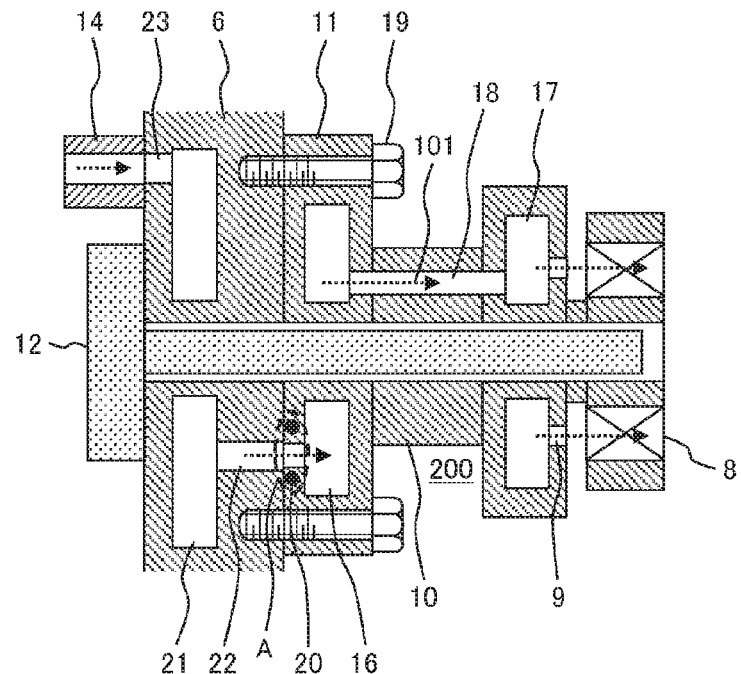
FIG. 4 is a partial longitudinal cross section around a burner in a second embodiment.

A second embodiment of the present invention is described below in reference to FIG. 4. FIG. 4 shows a longitudinal cross section around the burner 200 having the second embodiment of the present invention. The basic structure of this embodiment is the same as that of the first embodiment.

In this embodiment, in addition to the second manifold 16 of the burner flange 11 formed in the first embodiment, an annular third manifold 21 is formed in the end cover 6, and a fuel passage 22 that makes the second manifold 16 communicate with the third manifold 21 is formed.

In the second embodiment of the present invention configured as mentioned above, the end cover 6 to secure the burner 200 is also evenly cooled by the gaseous fuel 101. As a result, it becomes difficult to generate a large temperature difference in the end cover 6. For the same reason as the first embodiment, the leakage of the gaseous fuel to the outside can be prevented, and the more reliable combustor 3 than that of the first embodiment can be provided.

Also in this embodiment as in the first embodiment, an inlet fuel passage 23 and the fuel passage 22 (an outlet fuel passage for the third manifold 21) of the third manifold 21 are circumferentially opposed, and the fuel passage 22 (an inlet fuel passage for the second manifold 16) and fuel passage 18 (an outlet fuel passage 18 for the second manifold 16) of the second manifold 16 are circumferentially opposed. As a result, gaseous fuel can flow throughout the third manifold 21 and second manifold 16, and it becomes possible to make the temperature more uniform.

Third Embodiment

Figure 5:
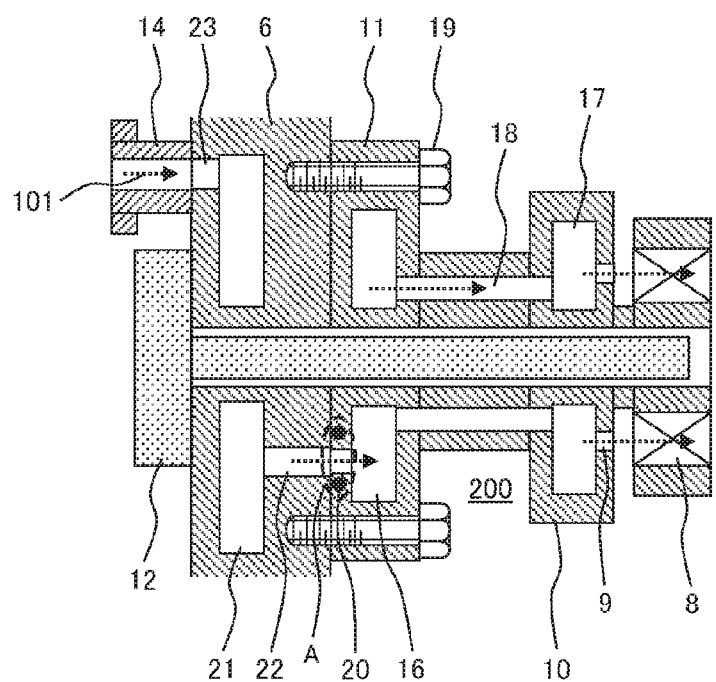
FIG. 5 is a partial longitudinal cross section around a burner in a third embodiment.

A third embodiment of the present invention is described below in reference to FIG. 5. FIG. 5 shows a longitudinal cross section around the burner 200 having the third embodiment of the present invention. The basic structure of this embodiment is the same as that of the second embodiment.

According to this embodiment, the multiple fuel passages 18 are circumferentially provided in the burner body 10 that makes the second fuel manifold 16 communicate with the manifold 17.

In the first embodiment, one fuel passage 18 is provided circumferentially. In the second embodiment, one fuel passage 18 and one fuel passage 22 are provided circumferentially. In this case, for example, a temperature difference occurs circumferentially of the burner body 10 to generate differential thermal expansion. This differential thermal expansion may cause thermal stress, and the components of the burner 200, such as the burner body, may be thus damaged.

For addressing the above disadvantage, in the third embodiment of the present invention, the gaseous fuel 101 flows through the multiple gaseous fuel passages 18 formed circumferentially in the burner body 10. As a result, the circumferential temperature difference of the burner body 10 can be made small to reduce the thermal stress. Therefore, the reliability of the components of the burner 200 can be improved.

Also in this embodiment, the multiple fuel passages 18 are provided circumferentially, but any advantageous effect is not spoiled even when the passage is annular. Further, the above advantageous effect is also obtained by providing the multiple fuel passages 22 that make the second manifold 16 communicate with the third manifold 21.

In the above embodiments of the present invention, the examples for provision of the annular second manifold 16 and annular third manifold 21 are explained on the assumption of the combustor having the liquid fuel nozzle 12. The manifolds do not necessarily need to have annular shapes, but may have various shapes. As the sealing component to prevent the leakage of the gaseous fuel 101 to the outside, the O ring 20 has been examplified. Other sealing components such as a gasket may be applied. Further, also when the components of the combustor are coupled by welding, the force on the welded portions due to the differential thermal expansion can be reduced. Therefore, the reliability of the combustor may be improved.

REFERENCE SIGNS LIST

1 . . . Compressor
2 . . . Turbine
3 . . . Combustor
4 . . . Generator
6 . . . End cover
7 . . . Inner tube
8 . . . Mixer
9 . . . Gaseous fuel nozzle
11 . . . Burner flange
12 . . . Liquid fuel nozzle
16, 17, 21 . . . Manifold
20 . . . O Ring
100 . . . Combustion air
101 . . . Gaseous fuel
200 . . . Burner

The invention claimed is:

1. A gas turbine combustor that mixes and combusts combustion air introduced from a compressor and gaseous fuel, and supplies produced combustion gas to a gas turbine, the gas turbine combustor comprising:
an inner tube to produce combustion gas by combusting the combustion air and the gaseous fuel;
an outer tube enclosing the inner tube;
an end cover located upstream of the outer tube; and
a burner secured to the end cover and installed in the inner tube,
the burner including:
a plurality of gaseous fuel nozzles to inject gaseous fuel;
a first manifold to distribute gaseous fuel to the plurality of gaseous fuel nozzles;
a burner flange to secure the burner to the end cover; and
a burner body to connect the first manifold and the burner flange,
wherein gaseous fuel passages are provided to flow gaseous fuel through the end cover, the burner flange, and the burner body, the gaseous fuel passages including a first gaseous fuel passage provided in the burner body, a second fuel passage provided in the burner flange, and a third fuel passage provided in the end cover, an inlet of the first gaseous fuel passage communicating with an outlet of the second fuel passage, an inlet of the second fuel passage communicating with an outlet of the third fuel passage, an outlet of the first gaseous fuel passage communicating with the first manifold,
an annular second manifold is provided in the burner flange,
the annular second manifold having a single inlet for fuel inflow and a single outlet for fuel outflow,
the second fuel passage includes an inlet side second fuel passage and an outlet side second fuel passage, the inlet side second fuel passage providing fluid communication between the outlet of the third fuel passage and the single inlet for fuel inflow of the annular second manifold, the outlet side second fuel passage providing fluid communication between the single outlet for fuel outflow of the annular second manifold and the inlet of the first gaseous fuel passage, and
the single inlet for fuel inflow of the second manifold and the single outlet for fuel outflow of the second manifold are disposed at opposite circumferential positions within the burner.

2. The gas turbine combustor according to claim 1, wherein a liquid fuel nozzle is located upstream of an axial center of the gas turbine combustor, secured to the burner via the end cover, and injects liquid fuel into the inner tube.

3. The gas turbine combustor according to claim 1, wherein a sealing component is provided between the end cover and the burner flange to prevent fuel from leaking.

4. A gas turbine combustor that mixes and combusts combustion air introduced from a compressor and gaseous fuel, and supplies produced combustion gas to a gas turbine, the gas turbine combustor comprising:
an inner tube to produce combustion gas by combusting the combustion air and the gaseous fuel;
an outer tube enclosing the inner tube;
an end cover located upstream of the outer tube; and
a burner secured to the end cover and installed in the inner tube,
the burner including:
a plurality of gaseous fuel nozzles to inject gaseous fuel;
a first manifold to distribute gaseous fuel to the plurality of gaseous fuel nozzles;
a burner flange to secure the burner to the end cover;
a burner body to connect the first manifold and the burner flange, an annular second manifold provided in the burner flange, the annular second manifold having a single inlet for fuel inflow and a single outlet for fuel outflow, and an annular third manifold provided in the end cover, the annular third manifold having a single inlet for fuel inflow and a single outlet for fuel outflow, wherein gaseous fuel passages are provided to flow gaseous fuel through the end cover, the burner flange, and the burner body, the gaseous fuel passages including a first gaseous fuel passage provided in the burner body, a second fuel passage provided in the burner flange and a third fuel passage provided in the end cover, an inlet of the first gaseous fuel passage communicating with an outlet of the second fuel passage, an inlet of the second fuel passage communicating with an outlet of the third fuel passage, an outlet of the first gaseous fuel passage communicating with the first manifold, the second fuel passage includes an inlet side second fuel passage and an outlet side second fuel passage, the third fuel passage includes an inlet side third fuel passage and an outlet side third fuel passage, the inlet side second fuel passage provides fluid communication between an outlet of the outlet side third fuel passage and the single inlet for fuel inflow of the annular second manifold, the outlet side second fuel passage provides fluid communication between the single outlet for fuel outflow of the annular second manifold and the inlet of the first gaseous fuel passage, an outlet of the inlet side third fuel passage communicates with the single inlet for fuel inflow of the annular third manifold, the outlet side third fuel passage provides fluid communication between the single outlet for fuel outflow of the annular third manifold and an inlet of the inlet side second fuel passage, and at least one of the second manifold and the third manifold is configured so that the single inlet for fuel inflow of the at least one of the second manifold and the third manifold and the single outlet for fuel outflow are disposed at opposite circumferential positions within the burner.

5. The gas turbine combustor according to claim 4, wherein a sealing component is provided between the end cover and the burner flange to prevent fuel from leaking.

6. The gas turbine combustor according to claim 4, wherein a liquid fuel nozzle is located upstream of an axial center of the gas turbine combustor, secured to the burner via the end cover, and injects liquid fuel into the inner tube.

* * * * *